US005554330A

United States Patent [19]

Flannery et al.

[11] Patent Number: 5,554,330

[45] Date of Patent: Sep. 10, 1996

[54] PROCESS FOR THE MANUFACTURING OF SHAPED ARTICLES

[75] Inventors: Steven J. Flannery, Ontario, Canada; Hans G. Bücking, Springe, Germany

[73] Assignees: Isoboard Enterprises Inc., Toronto, Canada; Bison-werke Bahre & greten GmbH & Co KG, Spring, Germany

[21] Appl. No.: 380,760

[22] Filed: Jan. 31, 1995

[51] Int. Cl.[6] .............................. B27N 3/08; B32B 31/20; B32B 31/22

[52] U.S. Cl. .......................... 264/113; 264/115; 264/122; 264/126; 264/128

[58] Field of Search .................................... 264/109, 112, 264/113, 115, 122, 128, 126

[56] References Cited

U.S. PATENT DOCUMENTS

| | | | |
|---|---|---|---|
| 3,493,528 | 2/1970 | Rakszawski et al. | 264/112 |
| 3,919,017 | 11/1975 | Shoemaker et al. | 264/123 |
| 4,393,019 | 7/1983 | Geimer | 264/128 |
| 4,882,112 | 11/1989 | Maki et al. . | |
| 4,883,546 | 11/1989 | Kunnemeyer | 264/113 |
| 5,134,023 | 7/1992 | Hsu | 264/109 |
| 5,374,474 | 12/1994 | Pratt et al. | 264/128 |

*Primary Examiner*—Robert A. Dawson
*Assistant Examiner*—Kenneth M. Jones
*Attorney, Agent, or Firm*—Lowe, Price, LeBlanc & Becker

[57] ABSTRACT

A process for preparing shaped articles comprises the steps of:

(a) mixing a water curable binder with vegetable particulate material to form a first mixture, the moisture content of said first mixture being insufficient to cure said binder prior to said mixture being placed in a mold;

(b) feeding said first mixture to a mold having molding plates, said molding plates and said first mixture defining an interface;

(c) providing water to at least a portion of said interface, the amount of water added at said interface, in conjunction with the moisture content of said first mixture, being sufficient to cure said binder; and, (d) subjecting said first mixture to elevated temperatures and pressures.

30 Claims, 3 Drawing Sheets

PROCESS FOR THE MANUFACTURING OF SHAPED ARTICLES

FIELD OF THE INVENTION

This invention relates to a process for producing shaped articles, including boards which may be used in the construction of furniture, housing and the like, which are made from a vegetable particulate matter.

BACKGROUND OF THE INVENTION

Various types of rigid boards are currently manufactured for use in industry. These include chip board, oriented strand board ("OSB"), medium density fibre board ("MDF)" and particle board. Generally, each of these boards comprises a mixture of wood (e.g. wood chips, saw dust, fibrous wood) and a formaldehyde based binder. Formaldehyde binders are thermosetting compounds and accordingly, the boards are formed under elevated temperatures and pressure.

There are several disadvantages with current board products. Boards which are constructed with formaldehyde binders typically release small amounts of formaldehyde into the atmosphere over an extended period of time (e.g. 10 years). OSB and particle board which are used in the construction of housing, as well as MDF which is used in the construction of furniture, therefore typically release formaldehyde into the air in a house, office or other dwelling. Formaldehyde vapours tend to cause a portion of the population discomfort (e.g. headaches). Recent health concerns have been raised by the emission of formaldehyde from such products.

A further disadvantage with wood based board products is the requirement of wood, either wood chips, saw dust, fibre wood and the like, as a feed material. The improvement in sawing and planing machinery has reduced the amount of wood bi-products produced by lumber mills. At the same time, other uses for wood bi-products, such as for use as fuel, has increased.

In recent years, different processes have been used in an attempt to reduce the reliance upon formaldehyde binders and wood chips. For example, U. S. Pat. No. 4,882,112 discloses a process for producing sheets or other shaped articles which includes applying a solution or dispersion of a hydrophilic urethane prepolymer in a large excess of water, optionally containing an inert binder polymer, to vegetable particulate materials, shaping the resulting mass, curing the shaped article at room temperature or an elevated temperature (e.g. about 22° C.) and drying the shaped article. One disadvantage of this process is the large amount of time which is required in curing and drying the shaped article. Example 2 exemplifies the production of a flexible sheet of about 8 mm thickness. The sheet required three minutes to cure and three hours to dry subsequent to the curing.

SUMMARY OF THE PRESENT INVENTION

In accordance with the instant invention, there is provided a process for preparing shaped articles comprising the steps of:

(a) mixing a water curable binder with vegetable particulate material to form a first mixture, the moisture content of the first mixture being insufficient to cure the binder prior to the mixture being placed in a mold;

(b) feeding the mixture to a mold having molding plates, the molding plates and the first mixture defining an interface;

(c) providing water to at least a portion of the interface, the amount of water added at the interface, in conjunction with the moisture content of the first mixture, being sufficient to cure the binder; and, (d) subjecting the first mixture to elevated temperatures and pressures.

The shaped article may be of various configurations. In a preferred embodiment, the shaped article comprises a board, such as a 4'×8' sheet having a thickness from about 0.25' to about 2.5' inches. In addition, by using the following alternate embodiment of this invention, a multilayer board may be prepared. According to this embodiment, a process for preparing a multilayer shaped articles having opposed outer layers and at least one inner layer comprises the steps of:

(a) mixing a water curable binder with vegetable particulate material to form a plurality of mixtures, a respective mixture being prepared for each layer of the shaped article, the moisture content of each of the mixtures being insufficient to cure the binder prior to the mixtures being placed in a mold;

(b) feeding the mixtures to a mold having molding plates, the mixtures being deposited in a plurality of layers in the mold in a predetermined order, the molding plates and the mixtures for the outer layers defining an interface;

(c) providing water to at least a portion of the interface, the amount of water added at the interface, in conjunction with the moisture content of all of the mixtures, being sufficient to cure the binder; and, (d) subjecting the mixtures to elevated temperatures and pressures.

One advantage of such boards and multilayer boards is that they have various uses including cabinet construction in houses as well as furniture. The boards have good strength (e.g. 80 psi IB) as determined by ASTM test D1037/CSA 0437) and are well adapted to retain screws, nails and other fastening devices. In addition, the boards are formaldehyde free and accordingly are more environmentally acceptable than formaldehyde based boards.

Preferably, the vegetable particulate material is derived from an annual plant and may in fact be a residual from other processing of the plant. The residual plant material may be derived from a variety of crops and may comprise flax, hemp, bagasse, corn stalks, cereal straw and mixtures thereof. More preferably, the vegetable particulate mater comprises a cereal straw and most preferably comprises wheat straw. The water curable binder preferably comprises an isocyanate binder. More preferably, the binder comprises a di-isocyanate such as methylene bisphenyl diisocyanate (MDI).

Pursuant to the process, the fibre is preferably reduced to the desired size. Preferably, at least about 75% of the vegetable particulate material is reduced in size so as to pass through a mesh screen having openings therein mearuring 2 mm by 2 mm, more preferably, at least about 80% is reduced to this size and, most preferably, at least about 90% is reduced to this size. The processing of the fibre produces fines (i.e. a particle which is sufficiently small so as to pass through a mesh screen having openings therein mearuring 0.35 mm by 0.35 mm). Preferably, from about 20 to about 40% of the vegetable particulate matter comprises fines, more preferably from about 20 to about 30 , and, most preferably from about 20 to about 25.

The fibre and binder may then be mixed together. Preferably, the mixture of vegetable particulate matter and binder comprises from about 1 to about 5 wt. % binder, more preferable from about 3 to about 5 wt. % and, most preferably about 4%, based on the combined weight of the vegetable particulate matter and binder. If a multilayer board is being prepared, then it is preferred that the outer layers of the board comprise a higher percentage of fines while the inner layer comprises a lesser amount of fines. The resultant board will have a smoother finish and will be more adapted for uses such as a higher quality board for use in furniture making.

The mixture, or plurality of mixtures which are deposited according to a predetermined sequence, are mixed and fed to caulplates. Water from an external source is sprayed on to the mixture of binder and vegetable particulate material as the board is formed on the caul plates. The amount of water which is added, in conjunction with the moisture content of the mixture, is sufficient to cure the binder. The formed mat and the caul plates are then fed into a mold having press platens which are preferably already heated to a temperature above 100° C., and more preferably from about 150° to about 220° C. The elevated temperature of the press platens causes the water to vapourize and to be driven towards the centre of the board.

It has been found that the addition of water at the interface results in a surprising increase in the rate of curing of the shaped articles in the mold. In addition, these rates of curing have been achieved using relatively low amounts of binder (e.g. about 3.5 wt. % binder). This substantial increase in the rate of curing in the mold results in a reduction in processing time on the order of about 50%.

BRIEF DESCRIPTION OF THE DRAWING

These and other advantages of the instant invention will be more fully and particularly understood in conjunction with the description of the following drawings of the preferred embodiment of the invention in which.

DESCRIPTION OF THE PREFERRED EMBODIMENT

The shaped articles which are prepared according to the instant invention comprise a mixture of vegetable particulate matter and a water curable binder.

The vegetable particulate matter may be obtained from various commercial crops and may include flax, hemp, bagasse, cotton stalks, cereal straw, husks of rice, peanuts and sunflowers, bamboo, reed, vine stalks, maize stalks, fibres of palm, jute, sisal and coconut. All of these products are generally grown as agricultural crops. After the cereal, vegetable or other usable portion of the plant is harvested, the remaining portion, which generally comprises a substantial portion of the plant (e.g. over 50% of the plant) must be disposed of. This agricultural waste material may be used as a feed source for the instant invention. This has several advantages. First, the process utilizes a readily renewable feed material. Further, this material is generally widely available and, due to the quantities of material involved, may otherwise comprise a difficult disposal problem in some areas.

Preferably, the vegetable particulate matter comprises material that is obtained from an annual plant. More preferably, the vegetable particulate matter comprises material that is obtained from one or more of the following: flax, hemp, bagasse, cotton stalks and cereal straw. Most preferably, the vegetable particulate matter comprises one or more cereal straws (e.g. wheat, barley).

The binder comprises a water curable binder. These are binders which cure on contact with water. Accordingly, the binder must be monitored during the processing operation to ensure that the binder does not set prior to the molding operation. Preferably, the binder is an isocyonate. More preferably, the binder is a di-isocyonate such as MDI.

Figure 1:
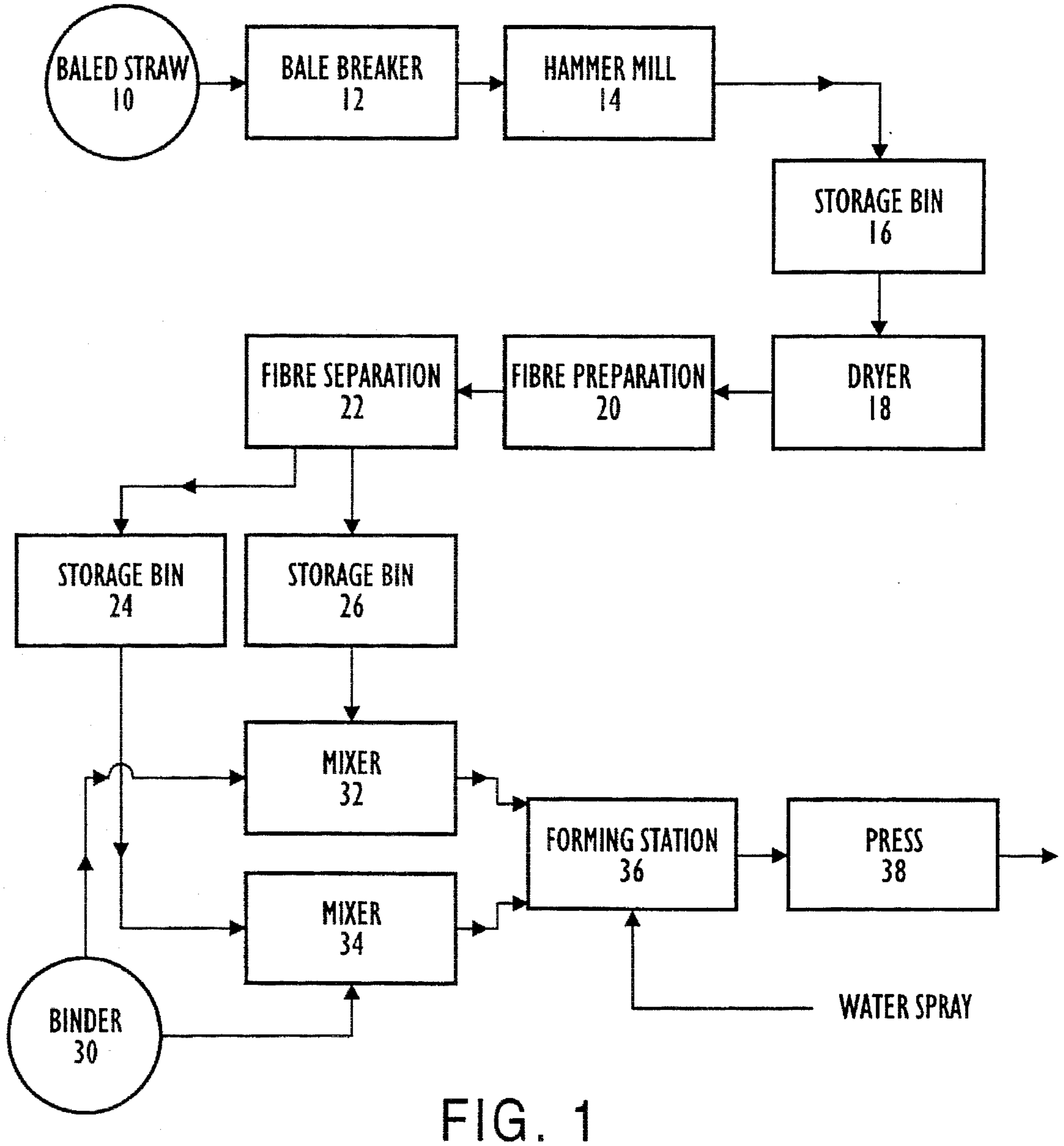
FIG. 1 is a schematic diagram of the process of the instant invention.

Referring to FIG. 1, the vegetable particulate matter which is utilized according to the instant invention is generally reduced to a more appropriate size for use in the selected shaped article. Typically, the vegetable particulate matter, once reduced in size will include material of various sizes. Depending upon the shaped article which is being produced and, in particular, the surface treatment which may be applied to the exterior surface of the shaped article, the vegetable particulate matter may be of various sizes and may have various particle size distributions. In addition, if a multilayer article is being produced, then the range of particle sizes and particle size distribution may differ for each layer.

For example, if the shaped article is a board, then the vegetable particulate matter is preferably reduced in size such that more than about 75% of the vegetable particulate matter is sized sufficiently small so as to pass through a mesh screen having openings therein mearuring 2 mm by 2 mm, more preferably at least about 80% of the vegetable particulate matter is so sized and, most preferably at least about 90% of the vegetable particulate matter is so sized.

Further, for the preparation of boards, it is also preferred that from about 20 to about 30 wt. % of the vegetable particulate matter comprises particles sized so as to pass through a 0.35 mm square mesh opening (i.e. fines); from about 40 to about 60 wt. % particles are sized so as to pass through a mesh opening varying in size from about 0.35 square to about 1 mm square; and, from about 10 to about 30 wt. % particles are sized so as to pass through a mesh opening varying in size from about 1 mm square to about 2 mm square. More preferably, the vegetable particulate matter has the following particle size distribution: from about 20 to about 25 wt. % sized so as to pass through a 0.35 mm square mesh opening (i.e. fines); from about 40 to about 50 wt. % particles sized so as to pass through a mesh opening varying in size from about 0.35 square to about 1 mm square; and, from about 20 to about 25 wt. % particles are sized so as to pass through a mesh opening varying in size from about 1 mm square to about 2 mm square.

As shown in FIG. 1, the raw furnish (which is processed into the vegetable particulate matter) is provided. In this case, baled wheat straw is provided. The baled straw enters the straw receiving area and is passed through a standard agricultural bale breaker to provide the initial size reduction of the straw 10. The straw is then fed to one or more hammermills 14 so as to further reduce the size of the straw. The reduced straw is then fed to storage bin 16 from which it is fed to drier 18.

Depending upon the binder which is used and the condition of the straw, the moisture content of the straw could be sufficient to commence the curing of the binder. The typical moisture content of the furnish will vary depending upon several factors including the specific kind of plant, the manner in which the furnish was stored prior to processing, the exposure of the furnish to the weather (i.e. rain, snow etc.) and the length of the stotage interval. The moisture content of the furnish may be as high as 25 wt. % but will generally be in the range of about 15 wt. %. Preferably, the moisture content of the furnish is reduced to less than about 12 wt. %, more preferably less than about 10 wt. % and, most preferably, from about 3 to about 8 wt. %. At these moisture content levels, a mixture of binder and divided furnish will not commence to cure for at least about 2 hours.

In order to reduce the moisture content of the furnish, the straw in storage bin 16 may be fed to drier 18. This may be accomplished by passing the divided straw through one or two natural gas fired multi-pass driers.

The dried straw may then be fed to a storage bin to await further processing (not shown). Alternately, further processing of the fibres may be required. For example, it may be desirable to further reduce the size of the fibres such as by cutting, shearing or refining the fibres. Referring to FIG. 1, this stage of processing is generally referred to by reference numeral 20 as fibre preparation. The exact operation which is conducted at this stage will vary depending upon the required fibre properties. The further processed fibre may then be sent to a storage bin for storage until subsequent processing (not shown).

If a multilayered product is being produced, in which the fibre characteristics of the various layers differ, then the processed straw from fibre preparation 20 may be fed to fibre separation unit 22 (see FIG. 1). The straw is separated into two or more groups. As shown in FIG. 1, the fibres are separated into coarse fibres which are stored in storage bin 24 and into finer fibres which are stored in storage bin 26. The finer fibres are preferably used in the outer layers of the product (so as to provide a smoother outer exterior). It will be appreciated by those skilled in the art that the straw may be separated into a plurality of different groups, each having a different particle size distribution. The straw may be separated by various means including passing the processed straw though a screen having an opening size of 0.03 inches.

The binder is stored in tank 30 and is fed to a mixer where it is intimately mixed with the processed straw. If a single layer shaped article is being prepared, then only one mixer may be utilized. However, if a multilayered shaped article is being prepared, then it is preferred to use a different mixture for each layer so that the straw and binder for the various layers may be mixed together concurrently. Accordingly, the binder and the finer straw in storage bin 26 may be fed to mixer 32 while the binder and the coarser straw in storage bin 24 may be fed to mixer 34. The mixer may use a variety of mixing techniques known in the art including the use of a spray nozzle or a spinning disc.

Figure 2:
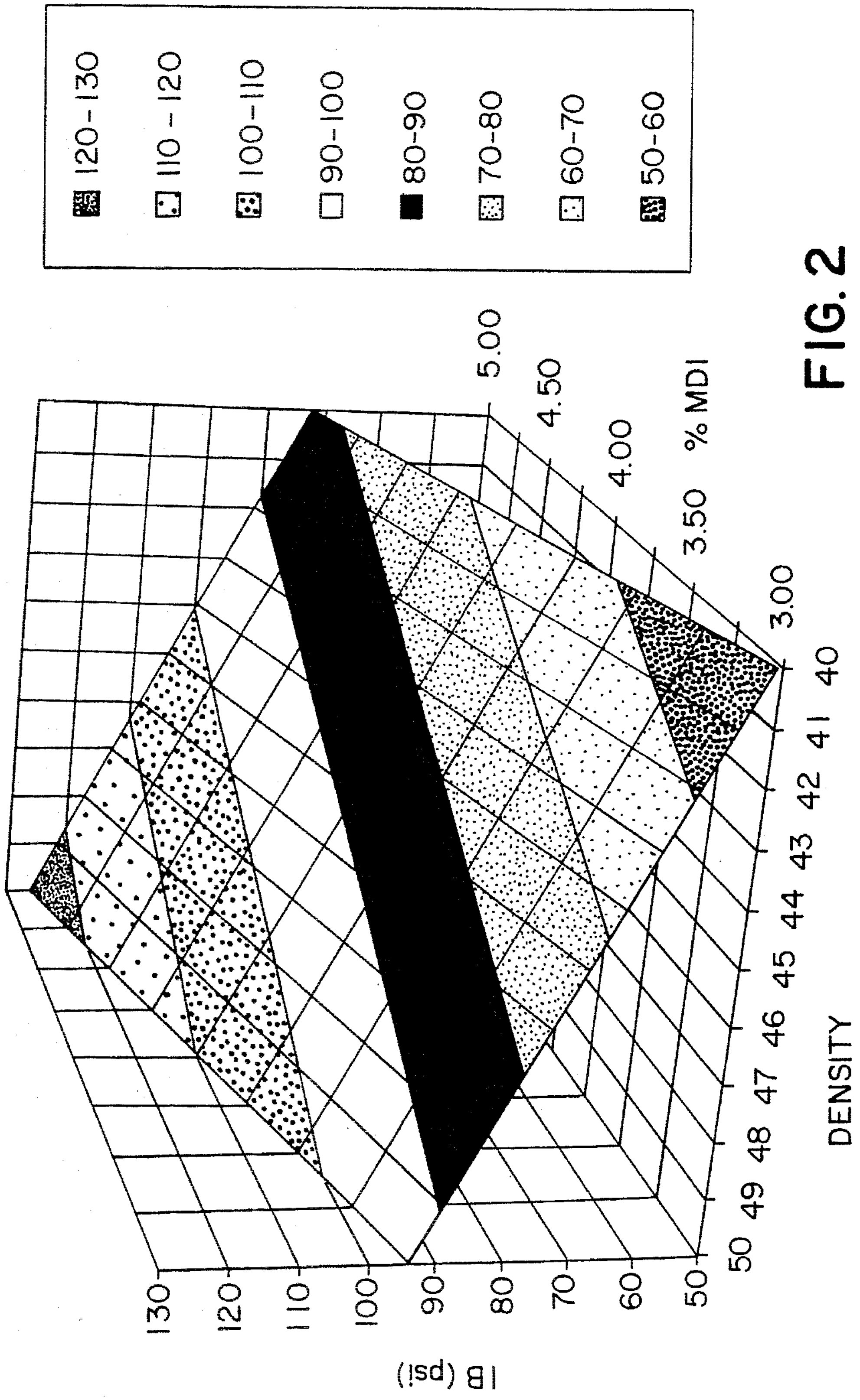
FIG. 2 is a graph of internal bond strength of the shaped articles lodged against binder content for various product densities.

The mixture of binder and processed straw may contain from about 1 to about 10 wt. % binder, more preferably from about 1 to about 5% and, most preferably from about 3 to about 4 wt. % binder. As shown in FIG. 2, the greater the amount of binder which is utilized, the greater the internal bond strength of the resulting product. However, the greater the amount of binder which is utilized, the longer the processing time. It has surprisingly been found that by using the process of the instant invention, boards having an internal bond strength of about 80 psi may be formed in a pressing time of only about 11 seconds per mm using 4% binder. If a multilayered board is being prepared, then the binder content of each layer may vary. In particular, the binder content of each layer may vary from about 1 to about 10 wt. % binder, more preferably from about 1 to about 5% and, most preferably from about 3 to about 4 wt. % binder. Accordingly, some layers of the board may be coated with small amounts of binder while other layers may comprise a substantial portion of binder.

The mixture of binder and straw is then fed to forming station 36 and subsequently to press 38. The design of forming station 36 and press 38 will vary depending upon the shaped article which is being manufactured. If the shaped article is a board, then forming station 36 may comprise a belt or the like adapted to receive caul plates onto which the mixture is deposited to produce a formed mat. In the case of a layered board, the mixtures from different mixers (e.g. mixer 32 and mixer 34) are fed in a predetermined pattern to forming station 36 where they are placed in layers upon the caul plates. Accordingly, the formed mat may comprise a lower and an upper outer layer of finer straw/binder mixture and internal core layer of the coarser straw/binder mixture therebetween. Once the mat has been formed, the formed mat is sent to press 38 to form the cured board. The molding plates (plattens in the case of a board) are already at an elevated temperature (e.g. 150°–220° C.) while the mixture is typically at ambient temperature (e.g. 20° C.). The outer layers of the formed mat define an interface with the plattens of press 38. Water is applied at this interface. Preferably, the water is applied to all of the interface. This may be achieved by spraying the water onto the caul plates and/or the mat prior to the formed mat being placed into the press. Alternately, the water may be sprayed to only a portion of the interface, such as by applying the water in a discontinuous pattern to the interface. The press may have one opening or a multiple number of openings. Alternately, the press may be designed to receive formed boards on a continuous basis. The amount of water which is applied in this manner is sufficient, in conjunction with the moisture content of the vegetable particulate material, to cure the binder. From about 10 to about 50 and more preferably from about 10 to about 30% of the water required to cure the binder is provided in this manner. Preferably, this amount of added water is equivalent to an increase from about 1.5 to about 2% in the moisture content of the vegetable particulate matter. The vaporization of this added water in the press enables the curing of the board. Generally, the press time may vary from about 5 to about 25 , more preferably from about 5 to about 20 and, most preferably from about 5 to about 15 seconds per mm of board thickness.

In the pressing operation, heat is supplied to the plattens to maintain in the desired temperature range. The mixture is subjected to a pressure of from about 0 to about 750 psi when the mixture is curing. At the end of this time, the mixture is degassed for, e.g. 10–30 seconds. The formed and cured board is then removed from the press.

The resultant board may have a density from about 25 to about 50 lbs/ft$^3$ and, more preferably from about 40 to about 50 lbs/ft$^3$. If the board is a multilayered board (e.g. two fine outer layers and a coarse inner layer) the surface layers may have a density from about 45 to about 70 lbs/ft$^3$ while the inner core layer may have a density from about 30 to about 45 lbs/ft$^3$. The board has an internal bond strength from about 70 to about 100, more preferably from about 70 to about 90 and, most preferably from about 80 to about 90 psi.

The invention will be more fully and particularly understood in accordance with the following examples. Those skilled in the art will appreciate that various modifications and additions to the process may be made and are within the scope of this invention.

EXAMPLE 1

This example demonstrates the production of two single layer boards (run nos. 1 and 2) and three multilayer boards (run nos. 3–5) from wheat straw and MDI. Wheat straw having a moisture content of about 4–5% of oven dry weight was utilized. The straw was reduced in size and then passed through a plurality of sieves to have the following particle size distribution.

TABLE 1

| PARTICLE SIZE DISTRIBUTION | | |
|---|---|---|
| Screen Opening Size (inch) | Wheat Fraction (g) | Wheat Fraction (%) |
| +0.055 | 12.4 | 9.9 |
| +0.039 | 19.4 | 15.4 |
| +0.033 | 10.6 | 8.4 |
| +0.023 | 21.9 | 17.4 |
| +0.016 | 25.1 | 20.0 |
| −0.016 | 36.2 | 28.8 |

The material was sorted into fine and coarse fractions by passing the sieved furnish through screens having an opening of 0.030 inches. The particle size distribution of the coarse and finer fractions are set out in the following table.

TABLE 2

| FRACTIONS (WT. %) | | |
|---|---|---|
| Screen Opening Size (inch) | Finer Fraction (wt. %) | Coarse Fraction (%) |
| +0.055 | 0 | 29 |
| +0.039 | 0 | 46 |
| +0.033 | 0 | 25 |
| +0.023 | 26 | 0 |
| +0.016 | 30 | 0 |
| −0.016 | 44 | 0 |
| Total | 100 | 100 |

The finer and coarser fractions were separately mixed with MDI resin. The resin was applied to the furnish with a spinning disk running at 1,200 r.p.m. in an 8 inch drum blender rotating at 26 r.p.m. A maximum of 1.5 hours elapsed before the mixture of resin and furnish entered the hot press.

The multilayer boards were prepared by depositing the mixtures of furnish and MDI resin onto flat steel caul plates. 100 grams of water (equivalent to an addition of about 1% in the moisture content of the furnish) was sprayed onto the bottom caul plate. Subsequently, approximately 1.36 kg. of the mixture of the finer fraction and MDI were placed on the plate. Then 8.13 kg. of the mixture of the coarser fraction and MDI were set out on the first mixture. Subsequently, 1.36 kg. of the mixture of the finer fraction and MDI were set out on top of the second mixture. Finally 100 grams of water (equivalent to an addition of about 1% in the moisture content of the furnish) was sprayed onto the top of the second mixture before placement of the top caul plate. The formed multilayer board was then pressed in a steam heated press to form a 3'×3', ¾" thick board.

The board was degassed and cooled. The following tests were performed on the boards after they had been cooled:

Modulus of Rupture (MOR)-ASTM D1037/CSA 0437)

Modulus of Elasticity (MOE)-ASTM D1037/CSA 0437

Internalk Bond (IB)-ASTM D1037/CSA 0437 \

Edge Screw Withdrawal-modified ANSI A208.2-1994 MDF

Face Screw Withdrawal-modified ANSI A208.2-1994 MDF

The results are set out in the following table.

The two single layer boards were prepared by a similar method as that used to prepare the multilayer boards. 100 grams of water (equivalent to an addition of about 1% in the moisture content of the furnish) was sprayed onto a bottom caul plate. Subsequently, 10.85 kg. of a mixture of the furnish set out in Table 1 and MDI resin was deposited on the flat steel caul plates. Finally 100 grams of water (equivalent to an addition of about 1% in the moisture content of the furnish) was sprayed onto the top of the mixture before placement of the top caul plate. The formed multilayer board was then pressed, degassed and cooled to form a 3'×3', ¾" thick board according to the same method as was used for the production of the multilayer boards. The single layer boards were tested in the same manner and the test results are also set out in the following table.

TABLE 3

OUT-OF-PRESS (HOT)

| Run #1 | Press Time (s) | MDI Content Face (%) | MDI Content Core (%) | Density (lb/ft$^3$) | Thickness (in.) | IB (psi) | Sample Density (lb/ft$^3$) | IB (psi) | Sample Density (lb/ft$^3$) | MOR (psi) | MOR (psi × 10$^3$) | Sample Density (lb/ft$^3$) |
|---|---|---|---|---|---|---|---|---|---|---|---|---|
| 1 | 265 | 3.75% | 3.75% | 42.0 | 0.756 | 81.3 | 42.9 | 82.9 | 43.3 | 3690 | 571 | 42.8 |
| 2 | 240 | 3.75% | 3.75% | 42.3 | 0.750 | 73.5 | 42.8 | 72.5 | 43.4 | 3740 | 603 | 43.2 |
| 3 | 265 | 3.00% | 4.00% | 42.3 | 0.744 | 78.9 | 42.6 | 85.4 | 43.3 | 3510 | 558 | 43.3 |
| 4 | 240 | 3.00% | 4.00% | 43.2 | 0.756 | 87.8 | 44.7 | 91.7 | 45.2 | 3450 | 592 | 44.7 |
| 5 | 215 | 3.00% | 4.00% | 42.2 | 0.752 | 79.3 | 42.2 | 94.1 | 43.0 | 3120 | 528 | 43.4 |

| Run # | Press Time (s) | MDI Content Face (%) | MDI Content Core (%) | Screw Withdrawal Edge (lbf) | Screw Withdrawal Face (lbf) | Avg. Thickness (in.) | Avg. Density (lb/ft$^3$) | Vertical Density Profile Top Face Max. (lb/ft$^3$) | Vertical Density Profile Core Min. (lb/ft$^3$) | Vertical Density Profile Bot. Face Max. (lb/ft$^3$) | Ratio Max/ Avg. | Ratio Max/ Avg |
|---|---|---|---|---|---|---|---|---|---|---|---|---|
| 1 | 265 | 3.75% | 3.75% | 186.5 | 213.8 | 0.760 | 43.3 | 62.1 | 30.8 | 64.4 | 1.46 | 0.71 |
| 2 | 240 | 3.75% | 3.75% | 145.6 | 234.4 | 0.755 | 43.4 | 59.1 | 30.3 | 64.5 | 1.42 | 0.70 |
| 3 | 265 | 3.00% | 4.00% | 191.9 | 223.2 | 0.744 | 43.3 | 63.9 | 30.3 | 67.9 | 1.52 | 0.70 |

TABLE 3-continued

| | | | | | | | | | | | | |
|---|---|---|---|---|---|---|---|---|---|---|---|---|
| 4 | 240 | 3.00% | 4.00% | 186.6 | 212.2 | 0.756 | 45.3 | 65.6 | 30.2 | 67.8 | 1.47 | 0.67 |
| 5 | 215 | 3.00% | 4.00% | 1.56.9 | 216.7 | 0.755 | 43.1 | 62.5 | 30.0 | 66.2 | 1.49 | 0.70 |

EXAMPLE 2

This example demonstrates the increased rate of manufacture which may be achieved using the instant invention.

Four single layer, homogeneous boards were manufactured from straw having a moisture content of about 4–5% based on oven dry weight and MDI in a similar manner to the procedure set out in Example 1. The particle size distribution of the straw was as follows:

TABLE 4

| PARTICLE SIZE DISTRIBUTION | |
|---|---|
| Opening Size (mm) | Wheat Fraction (%) |
| +4 × 4 | 0 |
| +2 × 2 | 0.3 |
| +1 × 1 | 24.8 |
| +0.4 × 0.4 | 36.3 |
| +0.2 × 0.2 | 99.2 |
| −0.2 × 0.2 | 16.4 |

Figure 3:
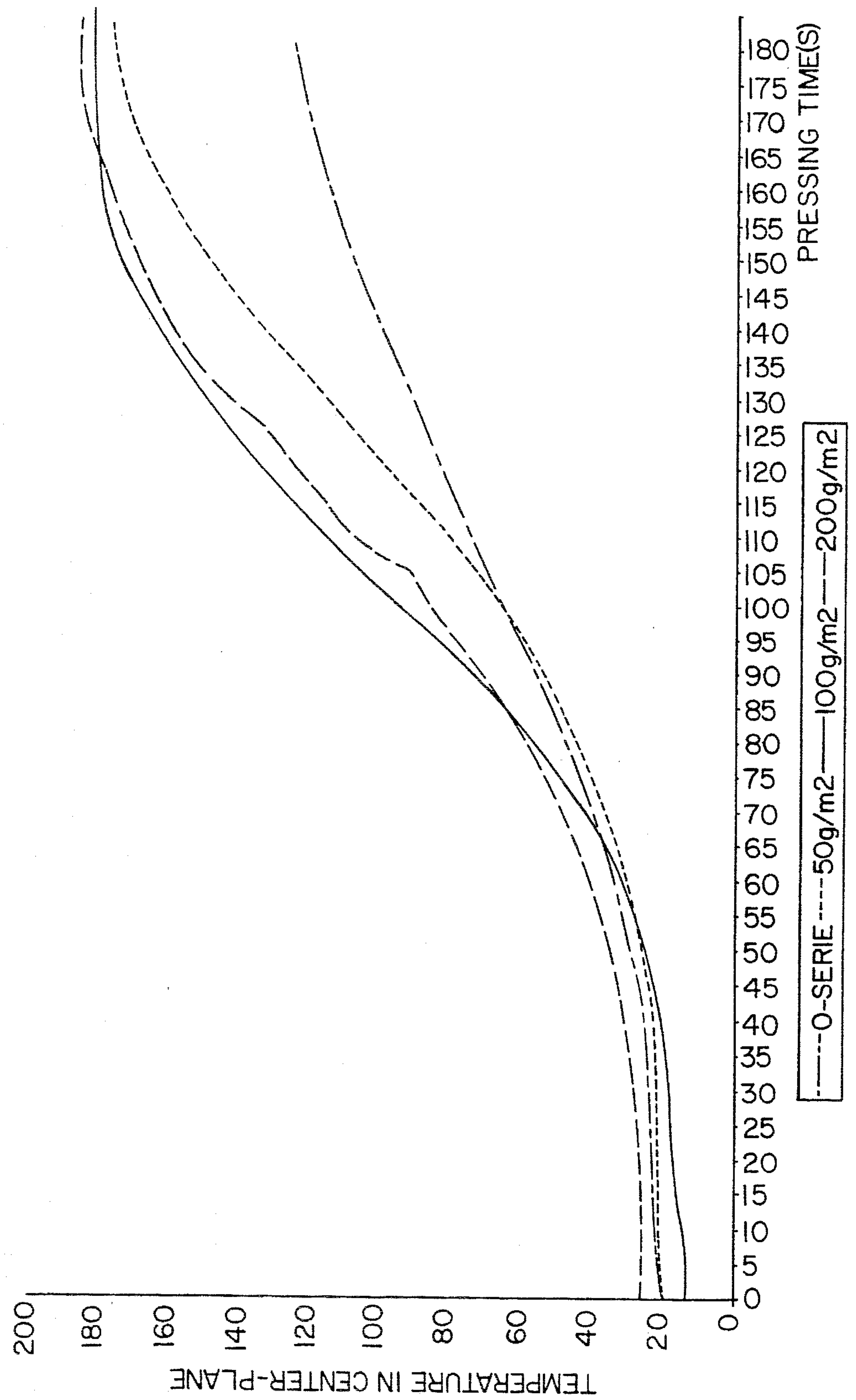
FIG. 3 is a graph of core temperature and pressing time.

The straw was mixed with MDI to form a board 630 mm by 500 mm by 17 mm. To this end, the mixture of straw and MDI was placed on a caul plate. After 50% of the mixture had been placed on the caul plate, a thermocouple was inserted. An equal amount of straw and MDI mixture was then deposited and the top caul plate was positioned thereon. In the first run, no water was sprayed onto the interface between the straw and MDI mixture and the caul plates. In the second, run, 50 g. (corresponding to a one percent increase in the moisture content of the straw) was sprayed at the top and bottom interfaces. In the third run, 100 g. of water was sprayed at each interface (a 2% increase in moisture content). In the fourth run, 200 g of water was sprayed at the interfaces (a 4% increase in moisture content). The results were set out in the graph of FIG. 3. As can be seen from this graph, the addition of 100 g of water per interface, (an increase of 2% in the moisture content of the straw) resulted in a substantial decrease in the amount of time required for the center line temperature of the board to reach 100° during pressing (a decrease from 140 seconds to about 103 seconds).

We claim:

1. A process for preparing shaped articles comprising the steps of:

(a) mixing a water curable binder with vegetable particulate material to form a first mixture, the moisture content of said first mixture being insufficient to cure said binder prior to said mixture being placed in a mold;

(b) feeding said first mixture to a mold having molding plates, said molding plates and said first mixture defining an interface;

(c) providing liquid water from an external source to at least a portion of said interface, the amount of water added at said interface, in conjunction with the moisture content of said first mixture, being sufficient to cure said binder; and, (d) subjecting said first mixture to elevated temperatures and and pressures.

2. The process as claimed in claim 1 wherein said water provided to said interface comprises from about 10 to about 50% of said water provided to said interface and said moisture content of said first mixture.

3. The process as claimed in claim 1 wherein said binder is intimately mixed with all surfaces of said vegetable particulate material.

4. The process as claimed in claim 1 wherein said binder comprises from about 1 to about 5 wt. % of said first mixture.

5. The process as claimed in claim 1 wherein said vegetable particulate material is prepared from an annual plant.

6. The process as claimed in claim 1 wherein said vegetable particulate material is prepared from a member of the group consisting of flax, hemp, bagasse, corn stalks, cereal, straw, and mixtures thereof.

7. The process as claimed in claim 1 wherein said vegetable particulate material comprises divided cereal straw.

8. The process as claimed in claim 1 wherein said vegetable particulate matter is sized to pass through a 2 mm square screen opening.

9. The process as claimed in claim 1 wherein said shaped article comprises a board and said molding plates comprise plattens.

10. The process as claimed in claim 1 wherein said binder comprises isocyanate.

11. The process as claimed in claim 1 wherein said binder comprises a diisocyanate.

12. The process as claimed in claim 1 wherein said plattens are at a temperature from about 150° to about 220° C. when said mixture is placed in said mold.

13. The process as claimed in claim 1 wherein said mixture is subject to said elevated pressure for about 5 to about 15 seconds per mm thickness of the shaped article and the shaped article is subsequently degassed.

14. A process for preparing multilayer shaped articles having opposed outer layers and at least one inner layer, the process comprising the steps of:

(a) mixing a water curable binder with vegetable particulate material to form a plurality of mixtures, a respective mixture being prepared for each layer of the shaped article, the moisture content of each of said mixtures being insufficient to cure said binder prior to said mixtures being placed in a mold;

(b) feeding said mixtures to a mold having molding plates, the mixtures being deposited in a plurality of layers in said mold in a predetermined order, said molding plates and said mixtures for said outer layers defining an interface;

(c) providing liquid water from an external source to at least a portion of said interface, the amount of water added at said interface, in conjunction with the moisture content of all of said mixtures, being sufficient to cure said binder; and, (d) subjecting said mixtures to elevated temperatures and pressures.

15. The process as claimed in claim 14 wherein said water provided to said interface comprises from about 10 to about 50% of said water provided to said interface and said moisture content of all of said mixtures.

16. The process as claimed in claim 15 wherein said binder is intimately mixed with all surfaces of said vegetable particulate material.

17. The process as claimed in claim 16 wherein said shaped article comprises a multilayer board and said molding plates comprise plattens.

18. The process as claimed in claim 17 wherein said binder comprises from about 1 to about 10 wt. % of said mixtures which form said outer layers.

19. The process as claimed in claim 18 wherein said binder comprises from about 1 to about 10 wt. % said mixtures which form said at least one inner layer.

20. The process as claimed in claim 19 wherein said binder comprises, on average, from about 1 to about 5 wt. % of the weight of said mixtures which form said opposed outer layers and said at least one inner layer.

21. The process as claimed in claim 19 wherein said vegetable particulate material comprises divided cereal straw.

22. The process as claimed in claim 21 wherein said vegetable particulate matter is sized to pass through a 2 mm square screen opening.

23. The process as claimed in claim 22 wherein said binder comprises an isocyanate.

24. The process as claimed in claim 22 wherein said binder comprises a diisocyanate.

25. The process as claimed in claim 14 wherein said plattens are at a temperature from about 150° to about 220° C. when said mixtures are placed in said mold.

26. The process as claimed in claim 14 wherein said mixtures are subject to said elevated pressure for about 5 to about 15 seconds per mm thickness of the shaped article and the shaped article is subsequently degassed.

27. The process as claimed in claim 1 wherein the moisture content of said material is from about 3 to about 8 wt. %.

28. The process as claimed in claim 27 wherein the moisture content of said material is less than about 5 wt. %.

29. The process as claimed in claim 14 wherein the moisture content of said material is from about 3 to about 8 wt. %.

30. The process as claimed in claim 29 wherein the moisture content of said material is less than about 5 wt. %.

* * * * *